(12) United States Patent
Matsui et al.

(10) Patent No.: US 9,378,881 B2
(45) Date of Patent: Jun. 28, 2016

(54) YOKE UNIT, YOKE UNIT MANUFACTURING METHOD, TORQUE DETECTION DEVICE, AND ELECTRIC POWER STEERING DEVICE

(71) Applicants: JTEKT CORPORATION, Osaka-shi, Osaka (JP); YAMASEI KOGYO CO., LTD., Nagoya-shi, Aichi-ken (JP)

(72) Inventors: Yusuke Matsui, Shiki-gun (JP); Fumihiko Mizutani, Nagoya (JP); Kunio Yamazaki, Handa (JP)

(73) Assignees: JTEKT CORPORATION, Osaka (JP); YAMASEI KOGYO CO., LTD., Nagoya (JP)

( * ) Notice: Subject to any disclaimer, the term of this patent is extended or adjusted under 35 U.S.C. 154(b) by 19 days.

(21) Appl. No.: 14/368,477

(22) PCT Filed: Dec. 25, 2012

(86) PCT No.: PCT/JP2012/083526
§ 371 (c)(1),
(2) Date: Jun. 24, 2014

(87) PCT Pub. No.: WO2013/099884
PCT Pub. Date: Jul. 4, 2013

(65) Prior Publication Data
US 2014/0345392 A1      Nov. 27, 2014

(30) Foreign Application Priority Data
Dec. 26, 2011    (JP) .................................. 2011-284355

(51) Int. Cl.
*H01F 3/14* (2006.01)
*B62D 6/10* (2006.01)
(Continued)

(52) U.S. Cl.
CPC ................ *H01F 3/14* (2013.01); *B62D 5/0481* (2013.01); *B62D 6/10* (2013.01); *G01L 3/04* (2013.01);
(Continued)

(58) Field of Classification Search
CPC ......... G01L 3/101; G01L 3/102; G01L 3/108; G01L 3/106; G01L 3/1457; G01L 3/04; H01F 3/14
USPC ........ 73/862.322, 862.331–862.338, 862.191
See application file for complete search history.

(56) References Cited

U.S. PATENT DOCUMENTS

| | | |
|---|---|---|
| 5,829,119 A | 11/1998 | Matsushita et al. |
| 5,943,760 A | 8/1999 | Barzideh et al. |

(Continued)

FOREIGN PATENT DOCUMENTS

| | | |
|---|---|---|
| CN | 102778315 A | 11/2012 |
| EP | 1835273 A2 | 9/2007 |

(Continued)

OTHER PUBLICATIONS

Jul. 1, 2014 International Preliminary Report on Patentability issued in International Application No. PCT/JP2012/083526 (with translation).

(Continued)

*Primary Examiner* — Lisa Caputo
*Assistant Examiner* — Octavia Hollington
(74) *Attorney, Agent, or Firm* — Oliff PLC

(57) ABSTRACT

A yoke unit includes a first yoke, a second yoke, and a resin section. The first yoke includes multiple first magnetic pole teeth. The second yoke includes multiple second magnetic pole teeth. The first magnetic pole teeth and the second magnetic pole teeth are arranged alternately. The resin section makes the yokes integral with each other. The resin section includes a recessed part formed in an inner surface of the resin section. The recessed part is arranged between the first magnetic pole tooth and the second magnetic pole tooth.

8 Claims, 17 Drawing Sheets

(51) Int. Cl.
*B62D 5/04* (2006.01)
*G01L 3/04* (2006.01)
*H01F 41/02* (2006.01)
*G01L 3/10* (2006.01)
*G01L 5/22* (2006.01)
*H01F 3/10* (2006.01)

(52) U.S. Cl.
CPC ............. *G01L 3/104* (2013.01); *G01L 5/221* (2013.01); *H01F 41/0246* (2013.01); *H01F 2003/103* (2013.01)

(56) References Cited

U.S. PATENT DOCUMENTS

| | | |
|---|---|---|
| 6,396,189 B1 | 5/2002 | Matsushita et al. |
| 6,880,411 B2 * | 4/2005 | Nakane et al. ............ 73/862.331 |
| 2004/0074316 A1 | 4/2004 | Nakane et al. |
| 2007/0295109 A1 | 12/2007 | Tokumoto et al. |
| 2012/0285266 A1 | 11/2012 | Takahashi et al. |

FOREIGN PATENT DOCUMENTS

| | | |
|---|---|---|
| JP | A-08-098498 | 4/1996 |
| JP | A-09-047007 | 2/1997 |
| JP | A-2007-093624 | 4/2007 |
| JP | A-2007-292550 | 11/2007 |
| JP | A-2008-002979 | 1/2008 |

OTHER PUBLICATIONS

Jun. 1, 2015 Chinese Office Action issued in Patent Application No. 201280064351.8.

Jan. 29, 2013 International Search Report issued in International Application No. PCT/JP2012/083526.

Feb. 3, 2016 European Search Report issued in European Application No. 12862154.7.

* cited by examiner

Fig.12(a)    Fig.12(b)
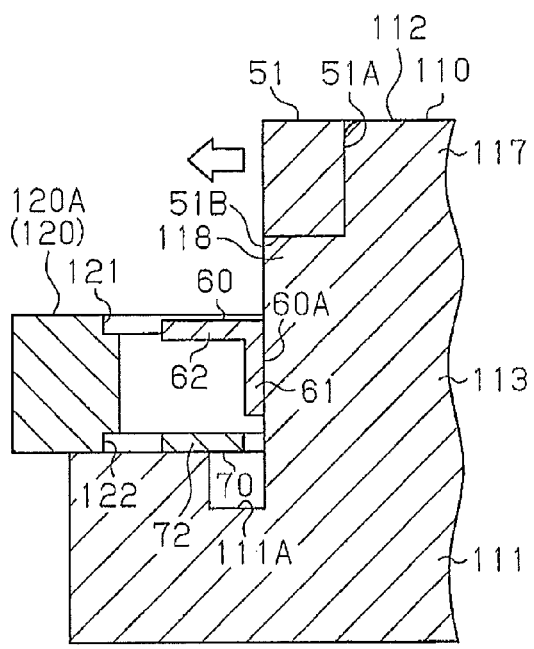
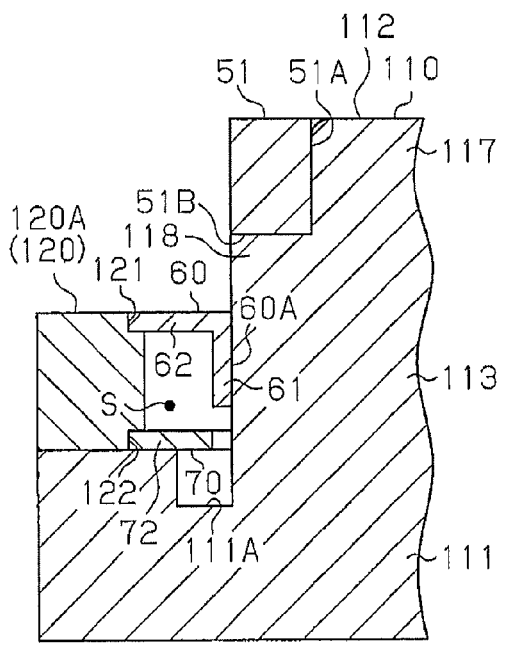
Fig.12(c)
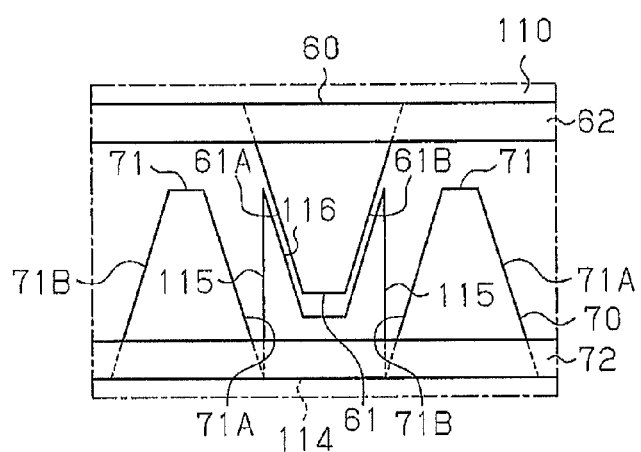

YOKE UNIT, YOKE UNIT MANUFACTURING METHOD, TORQUE DETECTION DEVICE, AND ELECTRIC POWER STEERING DEVICE

FIELD OF THE INVENTION

This invention relates to a yoke unit, a method of manufacturing the yoke unit, a torque detector including the yoke unit, and an electrically-driven power steering device including the torque detector.

BACKGROUND OF THE INVENTION

A conventional yoke unit 300 is described by referring to FIG. 19. The yoke unit 300 includes a first yoke 310, a second yoke 320, and a resin section 330. The first yoke 310 includes multiple first magnetic pole teeth 311, a first yoke core 312, and a through hole 313. The through hole 313 is formed in the first yoke core 312. The second yoke 320 includes multiple second magnetic pole teeth 321, a second yoke core 322, and a through hole 323. The through hole 323 is formed in the second yoke core 322. The first and second yokes 310 and 320 are coaxial with each other. Each of the second magnetic pole teeth 321 is arranged between two adjacent ones of the first magnetic pole teeth 311. The resin section 330 makes the first and second yokes 310 and 320 integral with each other. Patent Document 1 discloses an example of the conventional yoke unit.

A method of manufacturing the yoke unit 300 is described by referring to FIG. 20.

The yoke unit 300 is manufactured using a pin 500 and a lower mold 400, for example. First, the pin 500 is inserted into the through holes 323 and 313 in this order. This determines the respective positions of the first and second yokes 310 and 320 in the circumferential direction relative to the lower mold 400. Next, molten resin is poured into a space between a mold (not shown in the drawings) arranged around the lower mold 400 and the lower mold 400. Then, the molten resin is cured to shape the resin section 330.

The respective positions of the first and second yokes 310 and 320 in the circumferential direction are determined using the through holes 313 and 323. Hence, an error in the position of the through hole 313 or 323 might reduce the accuracy in the respective positions of the first and second yokes 310 and 320.

PRIOR ART DOCUMENTS

Patent Documents

Patent Document 1: Japanese Laid-Open Patent Publication No. 2008-2979

DISCLOSURE OF THE INVENTION

It is an object of this invention to provide a yoke unit that can suppress a reduction of accuracy in determining the respective positions of a first yoke and a second yoke, a method of manufacturing the yoke unit, a torque detector, and an electrically-driven power steering device.

In order to achieve the aforementioned object, a first aspect of this invention provides a yoke unit comprising: a first yoke with multiple first magnetic pole teeth; a second yoke with multiple second magnetic pole teeth, each of the second magnetic pole teeth being arranged between two adjacent ones of the first magnetic pole teeth, the second yoke being coaxial with the first yoke; and a resin section that makes the first and second yokes integral with each other. The resin section includes a recessed part formed in an inner surface of the resin section. The recessed part is arranged between the first magnetic pole tooth and the second magnetic pole tooth.

The yoke unit is manufactured by a first step, a second step, and a third step. In the first step, the first yoke is fitted to a lower mold to support the first and second yokes from respective inner surfaces of the first and second yokes. In the second step, the second yoke is fitted to the lower mold. In the third step, the resin section is shaped.

The inner surface of the resin section forming the yoke unit is provided with the recessed part arranged between the first magnetic pole tooth and the second magnetic pole tooth. Specifically, the lower mold includes a projecting part formed in a position corresponding to the recessed part. Thus, in the first step, the position of the first yoke in the circumferential direction relative to the lower mold can be determined by making the first magnetic pole tooth contact the projecting part. In the second step, the position of the second yoke in the circumferential direction relative to the lower mold can be determined by making the second magnetic pole tooth contact the projecting part. As a result, the respective positions of the first and second yokes can be determined in the circumferential direction. This can suppress a reduction of accuracy in the respective positions of the first and second yokes.

In the aforementioned yoke unit, it is preferable that the first magnetic pole tooth has a V shape in a front view of the first magnetic pole tooth, and the recessed part has a shape corresponding to the V shape.

The recessed part formed in the yoke unit has a V shape. Specifically, the projecting part of the lower mold used for manufacturing the yoke unit has a V shape. In this structure, the projecting part can support two tilted surfaces of the first magnetic pole tooth. This can improve accuracy in the respective positions of the first and second yokes in the circumferential direction relative to the projecting part.

In the aforementioned yoke unit, it is preferable that recessed part contacts the second magnetic pole tooth.

In the third step, the resin section can be shaped while the projecting part contacts the second magnetic pole tooth. Thus, in the third step, the position of the second yoke in the circumferential direction relative to the projecting part is unlikely to be shifted.

In the aforementioned yoke unit, it is preferable that a distance between an outer surface of the resin section in an area where the recessed part is not formed and the center of the yoke unit be smaller than a distance between the outer surface of the resin section in an area where the recessed part is formed and the center of the yoke unit.

In the resin section forming the yoke unit, the distance between the outer surface in the area where the recessed part is not formed and the center of the yoke unit is smaller than the distance between the outer surface in the area where the recessed part is formed and the center of the yoke unit. Specifically, the yoke unit is thinned in an area where the recessed part is not formed. This can reduce the weight of the yoke unit, compared to a yoke unit not subjected to thinning.

In order to achieve the aforementioned object, a second aspect of this invention provides a method of manufacturing a yoke unit. The yoke unit comprises a first yoke with multiple first magnetic pole teeth, a second yoke with multiple second magnetic pole teeth, and a resin section that makes the first and second yokes integral with each other. The first and second yokes are coaxial with each other. Each of the second magnetic pole teeth is arranged between two adjacent ones of the first magnetic pole teeth. The manufacturing method comprises: a first step of fitting the first yoke to a lower mold to support the first and second yokes from respective inner surfaces of the first and second yokes; a second step of fitting the second yoke to the lower mold; and a third step of shaping the resin section. In the first step, the position of the first yoke in the circumferential direction relative to the lower mold is determined by making the first magnetic pole tooth contact a projecting part formed in the lower mold. In the second step, the position of the second yoke in the circumferential direction relative to the lower mold is determined by making the second magnetic pole tooth contact the projecting part.

The lower mold includes the projecting part. Thus, in the first step, the position of the first yoke in the circumferential direction relative to the lower mold can be determined by making the first magnetic pole tooth contact the projecting part. In the second step, the position of the second yoke in the circumferential direction relative to the lower mold can be determined by making the second magnetic pole tooth contact the projecting part. As a result, the respective positions of the first and second yokes can be determined in the circumferential direction. This can suppress a reduction of accuracy in the respective positions of the first and second yokes.

In order to achieve the aforementioned object, a third aspect of this invention provides a torque detector comprising the aforementioned yoke unit or a yoke unit manufactured by the aforementioned method.

In order to achieve the aforementioned object, a fourth aspect of this invention provides an electrically-driven power steering device comprising the aforementioned torque detector.

This invention can provide a yoke unit that can suppress a reduction of accuracy in determining the respective positions of a first yoke and a second yoke, a method of manufacturing the yoke unit, a torque detector, and an electrically-driven power steering device.

BRIEF DESCRIPTION OF DRAWINGS

FIG. 12(a) is a partial sectional view showing a condition immediately before the surrounding mold is fitted in the mold clamping step D.

FIG. 12(b) is a partial sectional view showing a condition after the surrounding mold is fitted in the mold clamping step D.

FIG. 12(c) is a partial front view showing the projecting part and its vicinity of the lower mold in an enlarged manner.

DETAILED DESCRIPTION OF THE PREFERRED EMBODIMENTS (First Embodiment)

The structure of an electrically-driven power steering device is described by referring to FIGS. 1 to 4(b).

Figure 1:
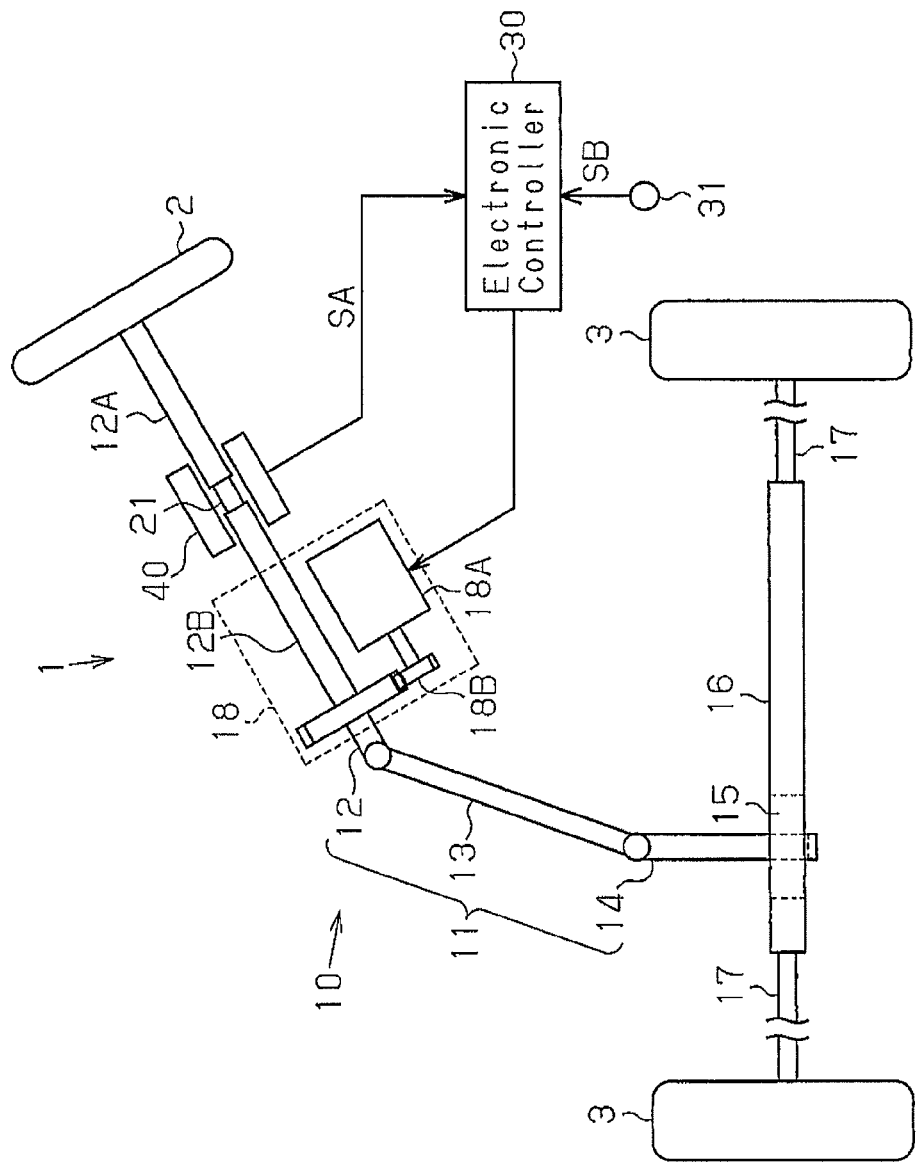
FIG. 1 is a schematic view showing an entire structure of an electrically-driven power steering device according to a first embodiment of this invention.

As shown in FIG. 1, an electrically-driven power steering device 1 includes a steering angle transmission mechanism 10, an assist actuator 18, an electronic controller 30, a torque detector 40, and a vehicle speed sensor 31. The steering angle transmission mechanism 10 includes a steering shaft 11, a rack-and-pinion mechanism 15, a tie rod 17, and a torsion bar 21. The steering angle transmission mechanism 10 transmits the rotation of the steering wheel 2 to turning wheels 3. The steering shaft 11 includes a column shaft 12, a pinion shaft 14, and an intermediate shaft 13. Operating the steering wheel 2 rotates the steering shaft 11.

The column shaft 12 includes an input shaft 12A and an output shaft 12B. The steering wheel 2 is fixed to the tip of the column shaft 12. The pinion shaft 14 is coupled to a rack shaft 16 through the rack-and-pinion mechanism 15. The intermediate shaft 13 connects the column shaft 12 and the pinion shaft 14. The rack-and-pinion mechanism 15 converts the rotation of the steering shaft 11 to the linear motion of the rack shaft 16. The tie rod 17 transmits the linear motion of the rack shaft 16 to a knuckle (not shown in the drawings).

Figure 2:
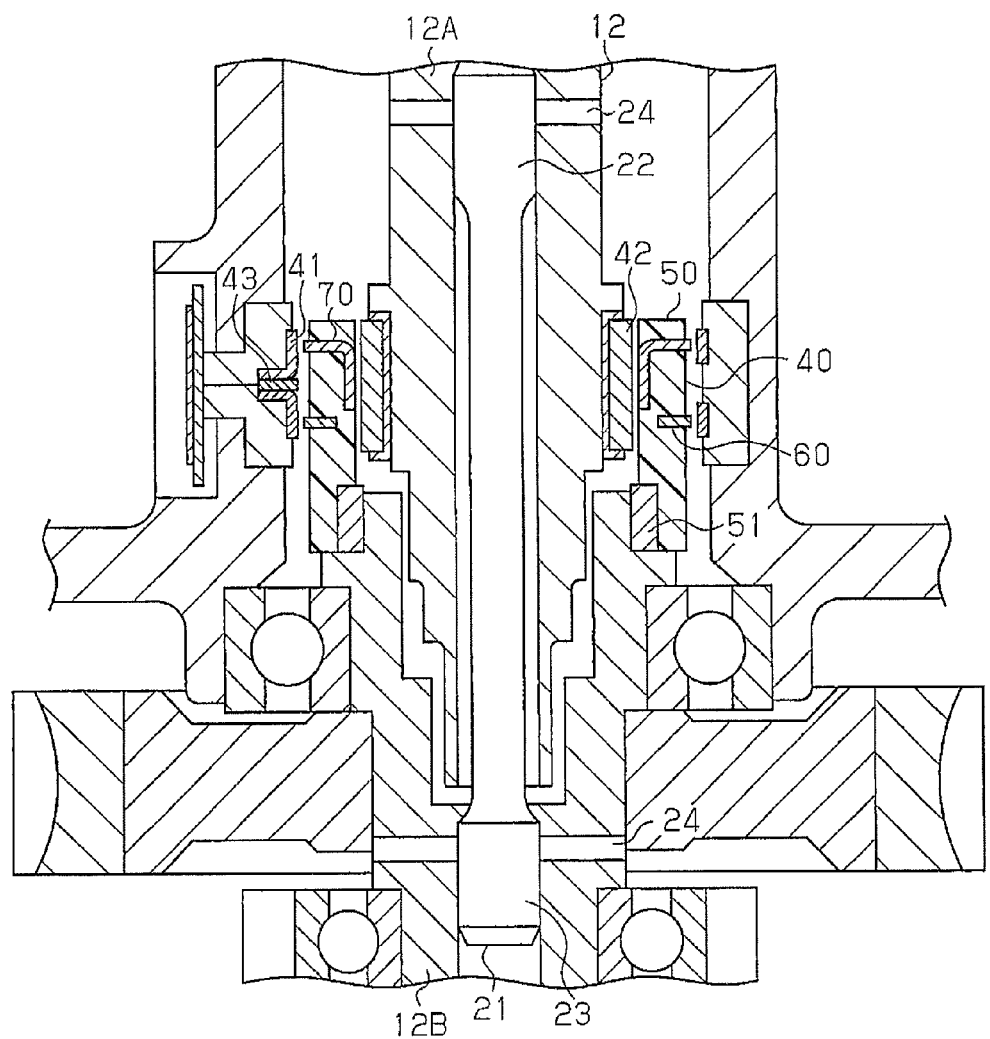
FIG. 2 is a partial sectional view showing a torque detector and its vicinity in an enlarged manner.

As shown in FIG. 2, the torsion bar 21 has two pins 24. The torsion bar 21 is arranged between the input and output shafts 12A and 12B. Rotating the steering wheel 2 generates torsion of the torsion bar 21. One of the pins 24 is used to fix an input side end portion 22 of the torsion bar 21 to the input shaft 12A of the column shaft 12. The other pin 24 is used to fix an output side end portion 23 of the torsion bar 21 to the output shaft 12B of the column shaft 12.

As shown in FIG. 1, the assist actuator 18 includes a motor 18A and a decelerating mechanism 18B. The assist actuator 18 applies assist force to be used to assist in the operation on the steering wheel 2 to the steering angle transmission mechanism 10. The rotation of the motor 18A is decelerated by the decelerating mechanism 18B and is then transmitted to the steering shaft 11. A torque applied at this time from the motor 18A to the steering shaft 11 acts as the assist force. A DC motor with brush is used as the motor 18A.

The torque detector 40 outputs an output signal SA to the electronic controller 30. The output signal SA is generated in response to a torque applied to the steering shaft 11 as a result of operation on the steering wheel 2. The vehicle speed sensor 31 outputs an output signal SB to the electronic controller 30. The output signal SB is generated in response to a rotation speed of the turning wheels 3 as rear wheels of a vehicle.

The electronic controller 30 calculates a steering torque T based on the output signal SA from the torque detector 40. The steering torque τ is a calculated value corresponding to a torque value input to the steering shaft 11 as a result of operation on the steering wheel 2. The electronic controller 30 calculates a vehicle speed V based on the output signal SB from the vehicle speed sensor 31. The vehicle speed V is a calculated value corresponding to a traveling speed of a vehicle.

The electronic controller 30 performs power assist control and steering torque shift control. The power assist control is performed to adjust the assist force in response to the traveling condition of a vehicle such as the vehicle speed V and the steering condition of the steering wheel 2. The steering torque shift control is performed to correct the steering torque T to be used in the power assist control.

Figure 3:
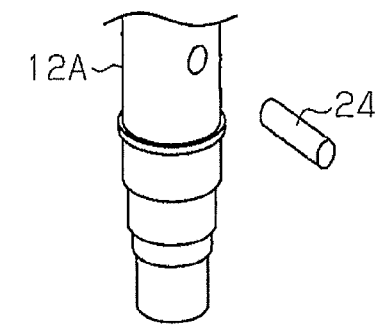
FIG. 3 is an exploded perspective view of the torque detector.
Figure 3:
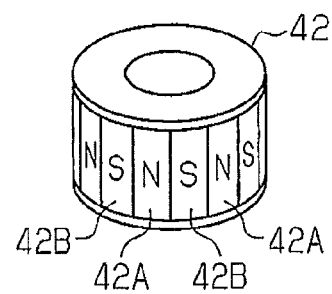
Figure 3:
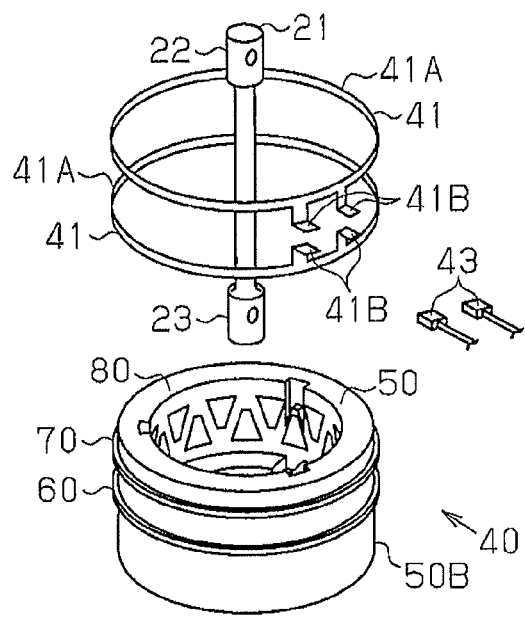
Figure 3:
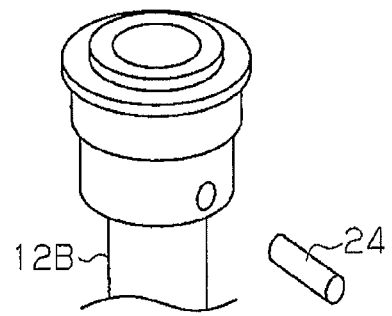

As shown in FIG. 3, the torque detector 40 includes two magnetism collecting rings 41, a cylindrical magnet 42, two magnetic sensors 43, and a yoke unit 50. Hall ICs are used as the magnetic sensors 43. Each of the magnetism collecting rings 41 has an annular part 41A and two arm parts 41B. One of the magnetism collecting rings 41 is arranged in a place corresponding to a first yoke 60 projecting from an outer surface 50B of the yoke unit 50. The other magnetism collecting ring 41 is arranged in a place corresponding to a second yoke 70 projecting from the outer surface 50B of the yoke unit 50. The annular part 41A is arranged to extend along the outer surface 50B of the yoke unit 50. The two arm parts 41B hold the magnetic sensors 43 therebetween.

In the cylindrical magnet 42, N poles 42A and S poles 42B are arranged alternately in the circumferential direction of the cylindrical magnet 42. The cylindrical magnet 42 is fixed to the input shaft 12A of the column shaft 12. Each of the magnetic sensors 43 is arranged between the arm parts 41B of one of the magnetism collecting rings 41 and the arm parts 41B of the other magnetism collecting ring 41. The yoke unit 50 is fixed to the output shaft 12B of the column shaft 12.

Figure 4A:
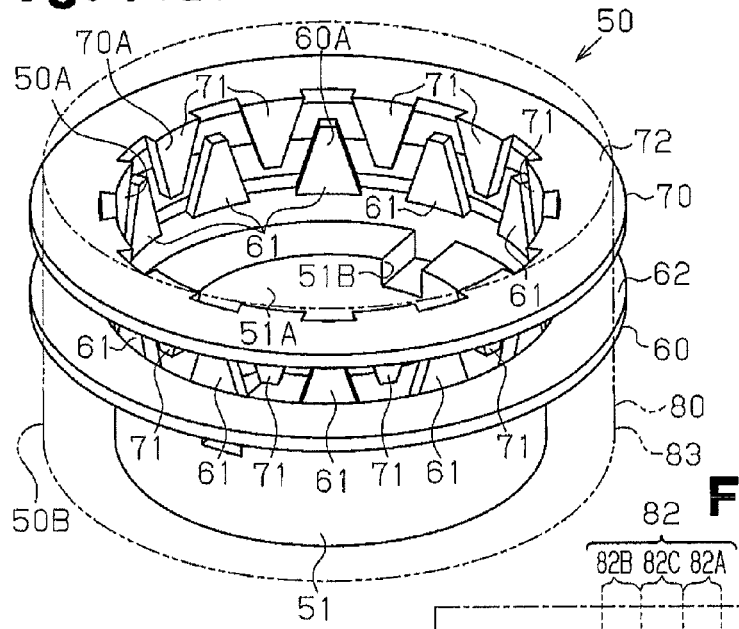
FIG. 4(a) is a perspective view showing the inside of a yoke unit.

In FIG. 4(a), only an outer surface 83 of a resin section 80 is indicated by alternate long and two short dashed lines and part of the resin section 80 except the outer surface 83 is not shown. As shown in FIGS. 3 and 4(a), the yoke unit 50 includes an inner surface 50A, the outer surface 50B, a collar 51, the first and second yokes 60 and 70, and the resin section 80. The collar 51 has a cylindrical shape. An end portion of the collar 51 where the collar 51 faces the first yoke 60 is given two groove parts 51B. The collar 51 receives the output shaft 12B of the column shaft 12 press fitted in the collar 51.

Figure 4C:
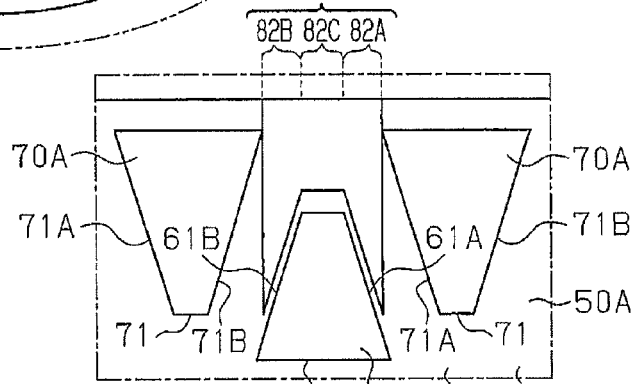
FIG. 4(c) is a partial front view showing a recessed part in an enlarged manner formed in an inner surface of the yoke unit.

The first yoke 60 includes multiple first magnetic pole teeth 61 and a first yoke core 62. The first yoke core 62 is composed of a flat plate and is formed into an annular shape about the axis line of the first yoke 60 as a center. Each of the first magnetic pole teeth 61 projects from the first yoke core 62 toward the second yoke 70. As shown in FIG. 4(c), the first magnetic pole tooth 61 has a first tilted part 61A and a second tilted part 61B. The first magnetic pole tooth 61 has a V shape in a front view.

As shown in FIG. 4(a), the second yoke 70 includes multiple second magnetic pole teeth 71 and a second yoke core 72. The second yoke core 72 is composed of a flat plate and is formed into an annular shape about the axis line of the second yoke 70 as a center. Each of the second magnetic pole teeth 71 projects from the second yoke core 72 toward the first yoke 60. As shown in FIG. 4(c), the second magnetic pole tooth 71 has a first tilted part 71A and a second tilted part 71B. The second magnetic pole tooth 71 has a V shape in a front view.

Figure 4B:
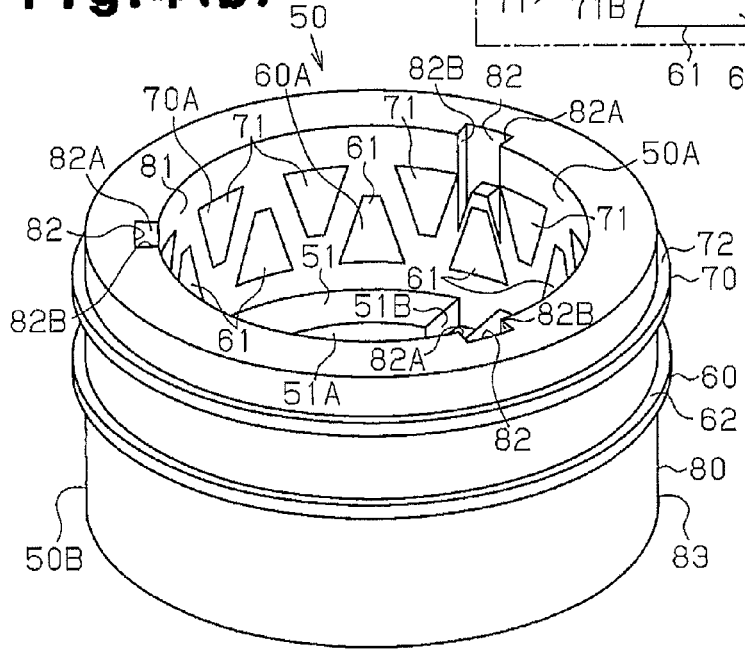
FIG. 4(b) is a perspective view of the yoke unit.

As shown in FIG. 4(b), the first and second yokes 60 and 70 are coaxial with each other. The first magnetic pole teeth 61 and the second magnetic pole teeth 71 are arranged alternately in the respective circumferential directions of the first and second yokes 60 and 70. As shown in FIG. 4(c), the first tilted part 61A of the first magnetic pole tooth 61 and the first tilted part 71A of the second magnetic pole tooth 71 face each other. The second tilted part 61B of the first magnetic pole tooth 61 and the second tilted part 71B of the second magnetic pole tooth 71 face each other.

As shown in FIG. 4(b), the resin section 80 includes an inner surface 81, three recessed parts 82, and the outer surface 83. The resin section 80 covers the respective outer circumferences of the first and second magnetic pole teeth 61 and 71. The resin section 80 fills in between the first and second magnetic pole teeth 61 and 71. The three recessed parts 82 are formed in the inner surface 81 of the resin section 80 while spaced out from each other at intervals of 120 degrees. The three recessed parts 82 are each formed between adjacent second magnetic pole teeth 71. The resin section 80 makes the first and second yokes 60 and 70 and the collar 51 integral with each other. This fixes the respective positions of the first and second yokes 60 and 70 and the collar 51. The first and second yokes 60 and 70 and the collar 51 are fixed while they do not contact each other.

As shown in FIG. 4(c), each of the recessed parts 82 is formed of a first recessed portion 82A, a second recessed portion 82B, and a third recessed portion 82C. The first recessed portion 82A is formed between the first tilted part 61A of the first magnetic pole tooth 61 and the first tilted part 71A of the second magnetic pole tooth 71. The second recessed portion 82B is formed between the second tilted part 61B of the first magnetic pole tooth 61 and the second tilted part 71B of the second magnetic pole tooth 71. The third recessed portion 82C is formed between an apex portion of the first magnetic pole tooth 61 and an end portion of the yoke unit 50. The third recessed portion 82C connects the first and second recessed portions 82A and 82B.

The first recessed portion 82A has a shape corresponding to the shape of the first tilted part 71A in an area where the first recessed portion 82A faces the second recessed portion 82B. The second recessed portion 82B has a shape corresponding to the shape of the second tilted part 71B in an area where the second recessed portion 82B faces the first recessed portion 82A. The recessed part 82 has a shape corresponding to the V shape of the first magnetic pole tooth 61. The first recessed portion 82A contacts the base end of the first tilted part 71A. The second recessed portion 82B contacts the base end of the second tilted part 71B. All the first, second, and third recessed portions 82A, 82B, and 82C do not contact the first magnetic pole tooth 61.

As shown in FIG. 4(*b*), the outer surface 50B of the yoke unit 50 is formed of the outer surface 83 of the resin section 80, and the respective outer surfaces of the first and second yoke cores 62 and 72. The inner surface 50A of the yoke unit 50 is formed of an inner surface 60A of the first yoke 60 as the inner surface of the first magnetic pole tooth 61, an inner surface 70A of the second yoke 70 as the inner surface of the second magnetic pole tooth 71, the inner surface 81 of the resin section 80, and an inner surface 51A of the collar 51.

The outer diameter of the yoke unit 50 is constant throughout the yoke unit 50 from its upper end toward its lower end. In the yoke unit 50, a section formed of the resin section 80 has an outer diameter slightly smaller than the outer diameter of a section formed of the first and second yoke cores 62 and 72. In the yoke unit 50, the section formed of the resin section 80 has a constant outer diameter. In the yoke unit 50, a section formed of the collar 51 has an inner diameter smaller than the inner diameter of the section of the yoke unit 50 except the collar 51.

A relationship between the yoke unit 50 and the cylindrical magnet 42 is described by referring to FIG. 3.

If torsion of the torsion bar 21 is not generated, a boundary between the N pole 42A and the S pole 42B of the cylindrical magnet 42 agrees with the center of each of the apex portions of the first and second magnetic pole teeth 61 and 71. At this time, the number of magnetic lines of force to reach the first and second magnetic pole teeth 61 and 71 from the N pole 42A is the same as the number of magnetic lines of force from the S pole 42B. Accordingly, the magnetic lines of force form a closed loop between the first and second yokes 60 and 70. As a result, the magnetic flux of the cylindrical magnet 42 does not reach a magnetic gap between the first and second yokes 60 and 70. In this case, the output signal SA from the magnetic sensors 43 indicates a reference value.

If torsion of the torsion bar 21 is generated as a result of steering action on the steering wheel 2, the boundary between the N pole 42A and the S pole 42B is shifted relative to the center of each of the apex portions of the first and second magnetic pole teeth 61 and 71. At this time, the boundary between the N pole 42A and the S pole 42B is shifted from the center of each of the apex portions of the first and second magnetic pole teeth 61 and 71. Accordingly, a larger number of magnetic lines of force reach one of the first and second magnetic pole teeth 61 and 71 from the N pole 42A than the number of magnetic lines of force from the S pole 42B. Further, a larger number of magnetic lines of force reach the other of the first and second magnetic pole teeth 61 and 71 from the S pole 42B than the number of magnetic lines of force from the N pole 42A. As a result, the magnetic flux of the cylindrical magnet 42 reaches the magnetic gap between the first and second yokes 60 and 70. In this case, the output signal SA from the magnetic sensors 43 indicates a magnitude responsive to the amount of the torsion of the torsion bar 21, specifically the amount of rotation of the steering wheel 2 (see FIG. 1).

Figure 5A:
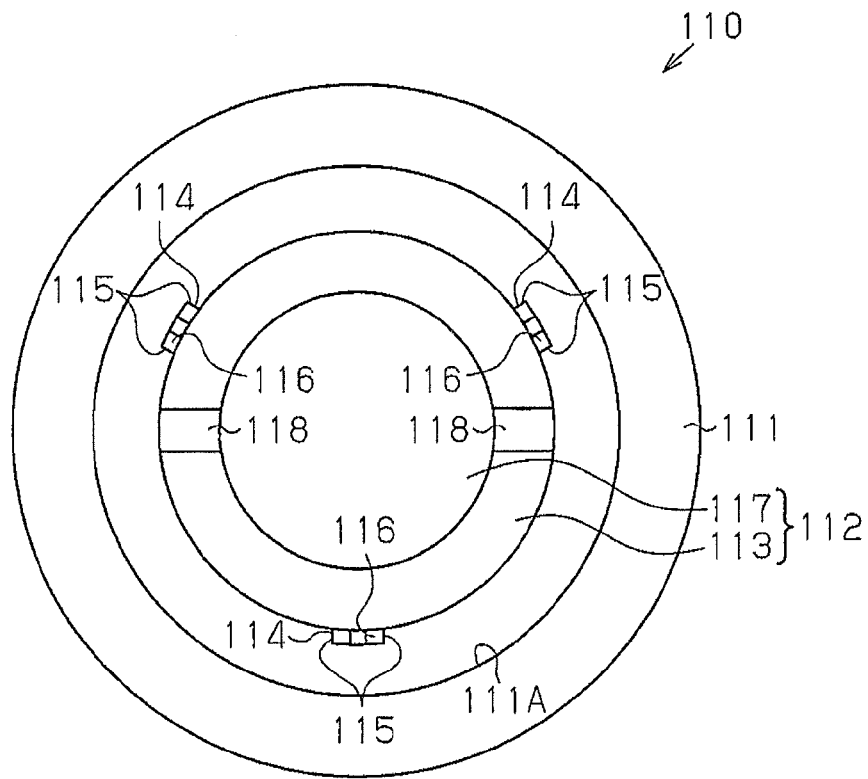
FIG. 5(a) is a plan view of a lower mold used for manufacturing the yoke unit.
Figure 5B:
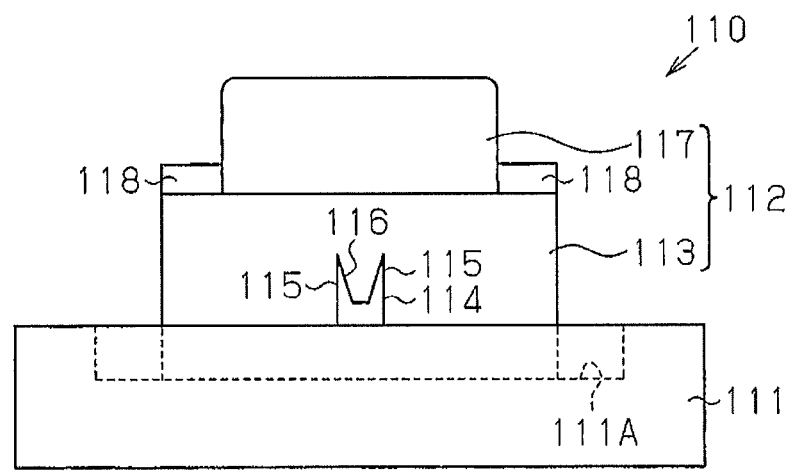
FIG. 5(b) is a front view of the lower mold.

A method of manufacturing the yoke unit 50 is described by referring to FIGS. 5(*a*) to 14(*b*).

Steps of manufacturing the yoke unit 50 include steps relating to injection molding. The steps relating to injection molding include a mold clamping step, an injecting step, a cooling step, a mold opening step, and an extracting step. The mold clamping step includes a mold clamping step A, a mold clamping step B, a mold clamping step C, a mold clamping step D, and a mold clamping step E.

Figure 10:
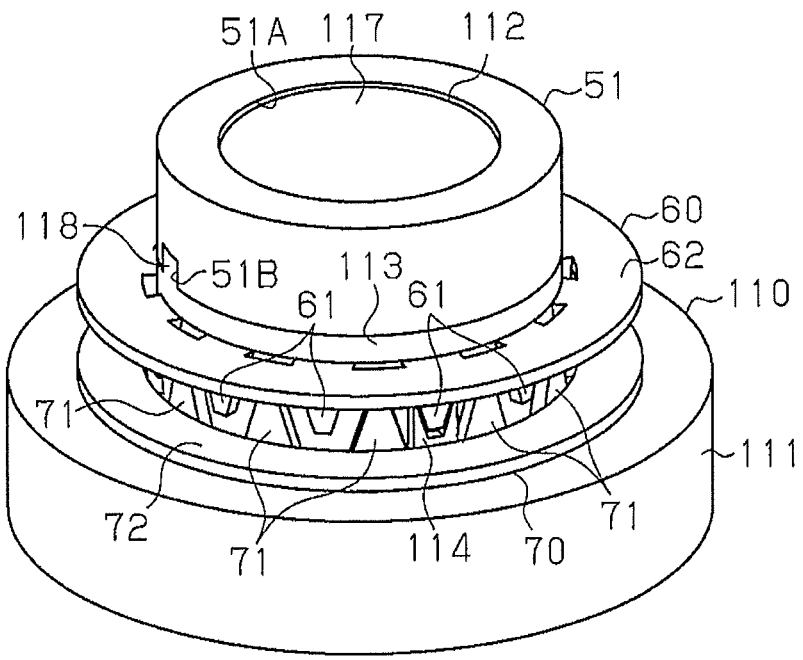
FIG. 10 is a perspective view showing a mold clamping step C.
Figure 11:
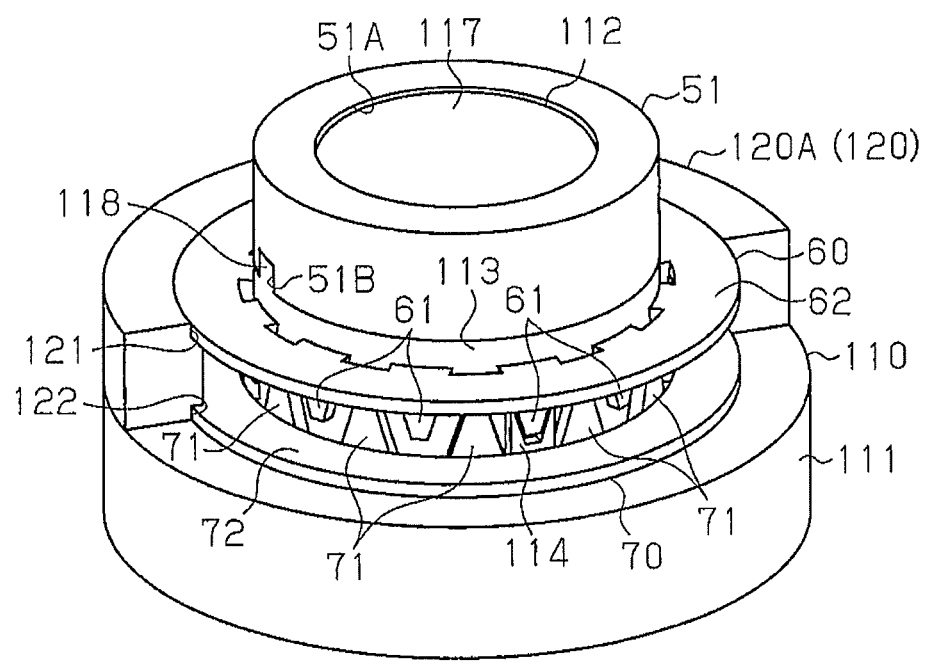
FIG. 11 is a perspective view showing a mold clamping step D.

First, as shown in FIG. 8(*a*), in the mold clamping step A, the second yoke 70 is arranged in a place prepared in a lower mold 110 for the second yoke 70. Next, as shown in FIG. 9(*a*), in the mold clamping step B, the first yoke 60 is arranged in a place prepared in the lower mold 110 for the first yoke 60. Next, as shown in FIG. 10, in the mold clamping step C, the collar 51 is arranged in a place prepared in the lower mold 110 for the collar 51. Next, as shown in FIG. 11, in the mold clamping step D, a surrounding mold 120 is arranged relative to the lower mold 110. Next, as shown in FIG. 13(*a*), in the mold clamping step E, an upper mold 130 is arranged relative to the lower mold 110 and the surrounding mold 120. In the injecting step, resin as a molding material is poured into filling space S formed between the outer circumference of the lower mold 110 and the respective inner circumferences of the surrounding mold 120 and the upper mold 130. The mold clamping step A corresponds to a "second step." The mold clamping step B corresponds to a "first step." The cooling step corresponds to a "third step."

As shown in FIGS. 5(*a*), 5(*b*) and 8(*a*), the lower mold 110 includes a mount section 111 and a cylindrical section 112. The mount section 111 supports the second yoke 70 from below. The mount section 111 has a groove part 111A. The groove part 111A is provided near the lower end of the cylindrical section 112 and extends along the outer circumferential surface of the cylindrical section 112. The cylindrical section 112 has a yoke fitting part 113 and a collar fitting part 117. The first and second yokes 60 and 70, and the collar 51 are fitted to the cylindrical section 112. The collar 51 is fitted to the collar fitting part 117. The collar fitting part 117 is smaller in outer diameter than the yoke fitting part 113.

The yoke fitting part 113 includes three projecting parts 114 and collar fixing parts 118. The first and second yokes 60 and 70 are fitted to the yoke fitting part 113. The collar fixing parts 118 are formed at the upper end of the yoke fitting part 113. The groove parts 51B of the collar 51 are fitted to the collar fixing parts 118. The three projecting parts 114 are formed near a boundary between the yoke fitting part 113 and the mount section 111. The respective lower ends of the three projecting parts 114 are placed in the groove part 111A. The projecting parts 114 are formed at the circumferential surface of the cylindrical section 112 while spaced out from each other at intervals of 120 degrees.

As shown in FIG. 8(*b*), each of the projecting parts 114 has side surfaces 115 and a support surface 116. The side surfaces 115 are formed on opposite sides of each of the projecting parts 114. The side surfaces 115 extend in the axis direction of the cylindrical section 112. The support surface 116 is formed between the two side surfaces 115. The support surface 116 has a V shape to correspond to the first magnetic pole tooth 61 shown in FIG. 4(*c*).

Figure 6A:
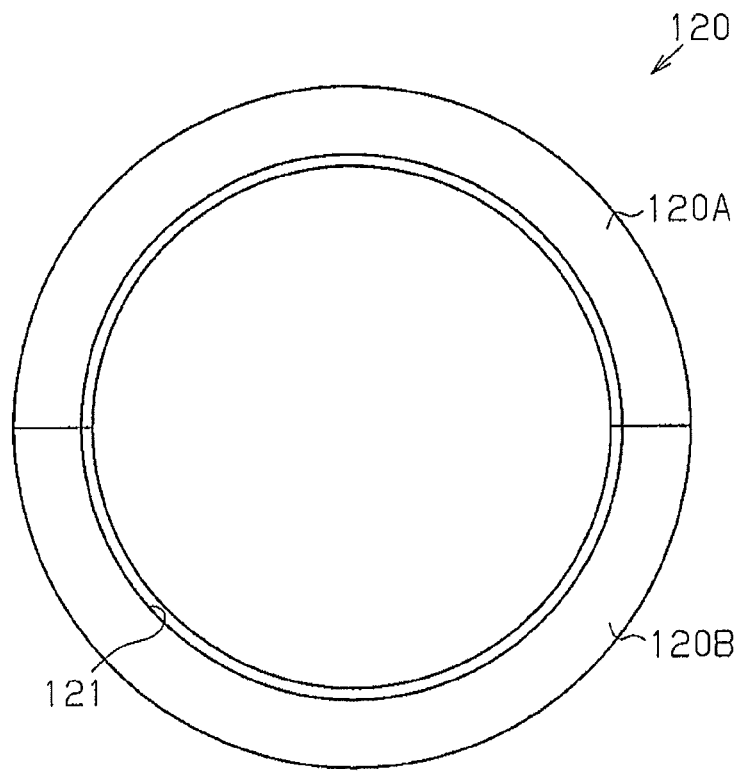
FIG. 6(a) is a plan view of a surrounding mold used for manufacturing the yoke unit.
Figure 6B:
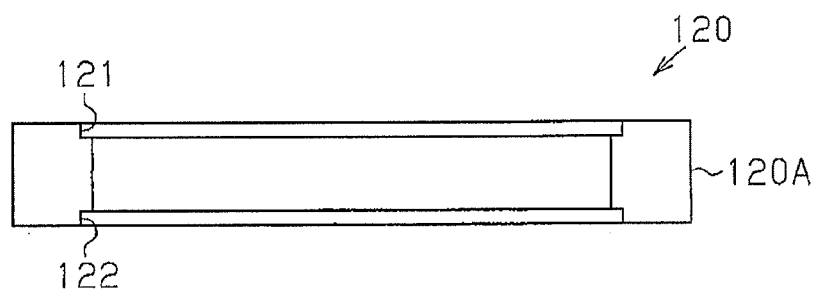
FIG. 6(b) is a side view of a first partitioned body forming the surrounding mold.

As shown in FIGS. 6(*a*) and 6(*b*), the surrounding mold 120 is formed of a first partitioned body 120A and a second partitioned body 120B. The first and second partitioned bodies 120A and 120B combined with each other form a cylindrical shape of the surrounding mold 120. The inner surface of the surrounding mold 120 projects toward the axis line of the surrounding mold 120 at an intermediate area of the surrounding mold 120 in the axis direction thereof. This forms a first ring groove 121 and a second ring groove 122 in opposite end portions of the inner surface of the surrounding mold 120 in the axis direction of the surrounding mold 120.

Figure 7A:
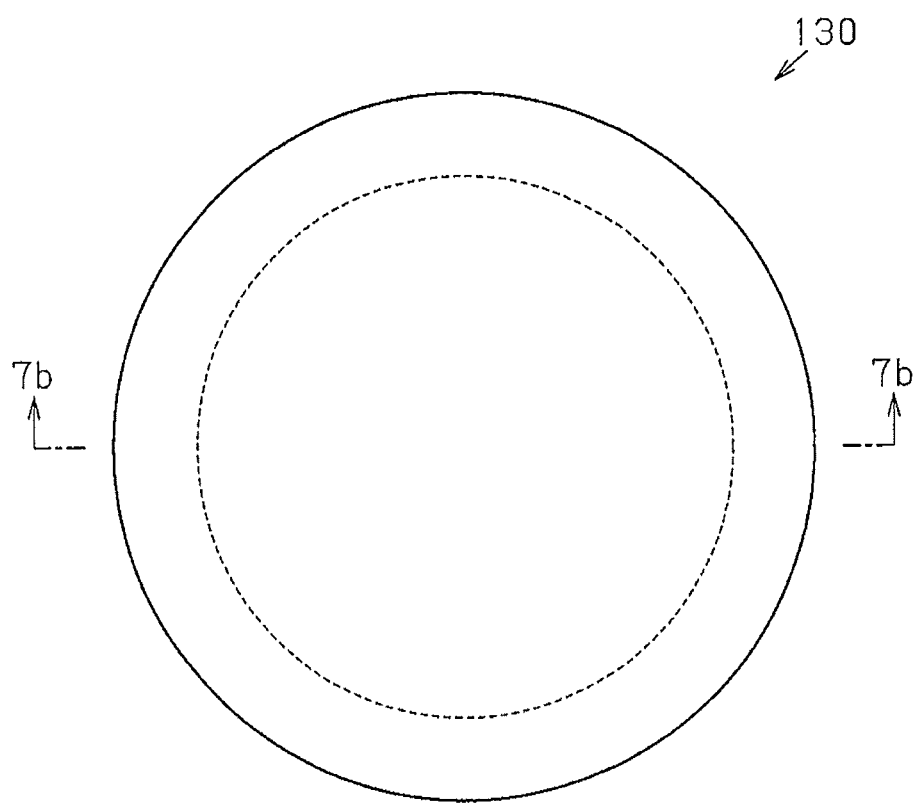
FIG. 7(a) is a plan view of an upper mold used for manufacturing the yoke unit.
Figure 7B:
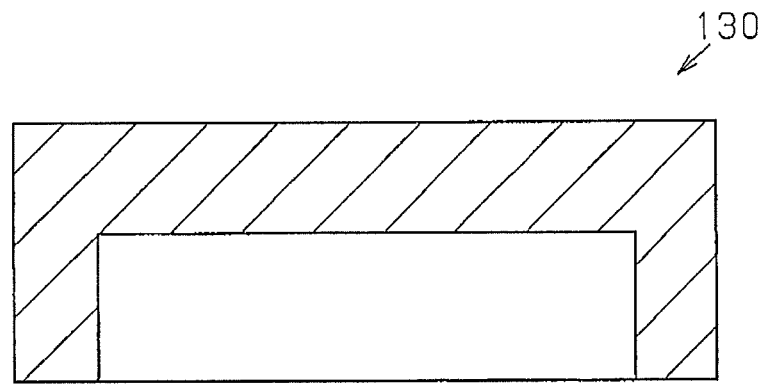
FIG. 7(b) is a sectional view taken along line 7b-7b of FIG. 7(a).

As shown in FIGS. 7(a) and 7(b), the upper mold 130 has a cylindrical shape with a closed bottom. The upper mold 130 is the same in inner diameter as the surrounding mold 120.

The injection molding steps of the yoke unit 50 are described next by referring to FIGS. 8(a) to 14(b).

(Mold Clamping Step A)

Figure 8A:
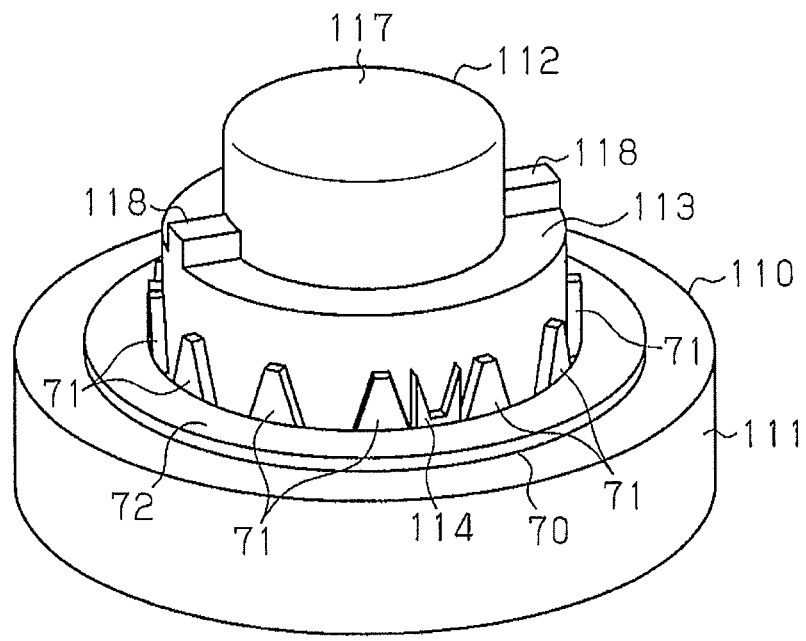
FIG. 8(a) is a perspective view showing a mold clamping step A.
Figure 8B:
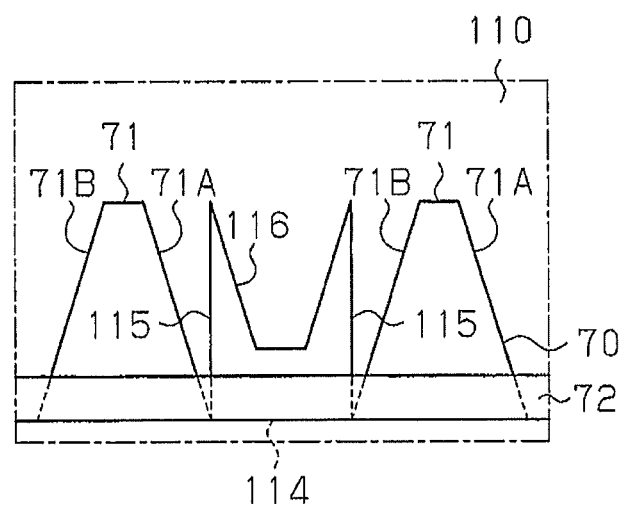
FIG. 8(b) is a partial front view showing a projecting part and its vicinity of the lower mold in an enlarged manner.

As shown in FIGS. 8(a) and 8(b), the second yoke 70 is fitted to the cylindrical section 112 with the second magnetic pole tooth 71 pointed upward. The projecting part 114 of the cylindrical section 112 is fitted in between adjacent second magnetic pole teeth 71. In this condition, the respective lower ends of the adjacent second magnetic pole teeth 71 and the lower ends of the side surfaces 115 of the projecting part 114 contact each other. This determines the position of the second yoke 70 in the circumferential direction relative to the cylindrical section 112.

(Mold Clamping Step B)

Figure 9A:
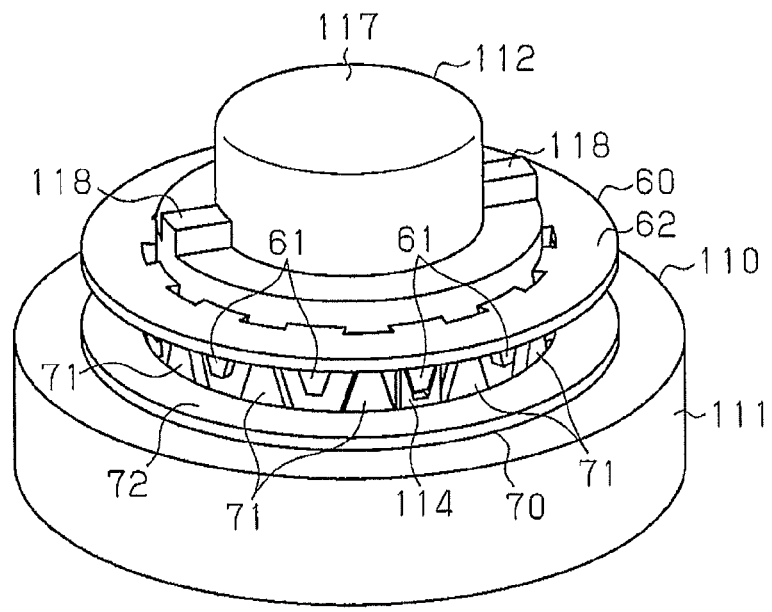
FIG. 9(a) is a perspective view showing a mold clamping step B.
Figure 9B:
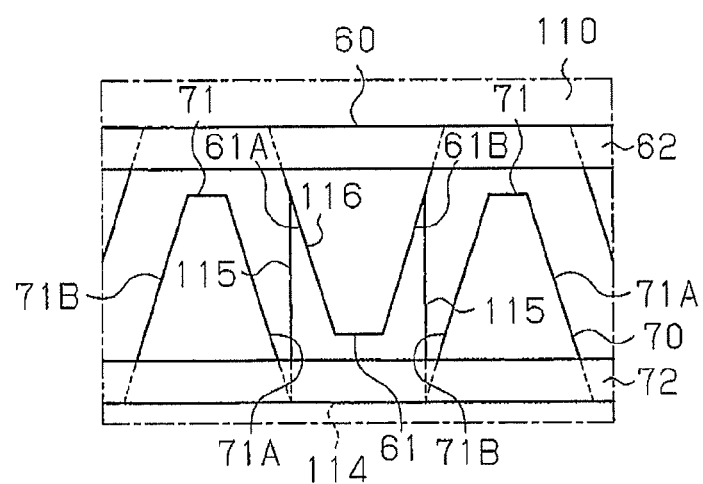
FIG. 9(b) is a partial front view showing the projecting part and its vicinity of the lower mold in an enlarged manner.

As shown in FIGS. 9(a) and 9(b), the first yoke 60 is fitted to the cylindrical section 112 with the first magnetic pole tooth 61 pointed downward. The first magnetic pole tooth 61 is fitted to a position inside the support surface 116 of the projecting part 114. In this condition, the support surface 116 contacts the first and second tilted parts 61A and 61B of the first magnetic pole tooth 61. This determines the position of the first yoke 60 in the circumferential direction relative to the cylindrical section 112. Performing the mold clamping steps A and B determines the respective positions of the first and second yokes 60 and 70 in the circumferential direction relative to each other.

(Mold Clamping Step C)

As shown in FIG. 10, the collar 51 is fitted to the collar fitting part 117 from a position above the first yoke 60. The groove parts 51B of the collar 51 are fitted to the collar fixing parts 118. This determines the position of the collar 51 in the circumferential direction relative to the cylindrical section 112.

(Mold Clamping Step D)

As shown in FIG. 11, the first partitioned body 120A of the surrounding mold 120 is placed over the mount section 111. While not shown in the drawings, the second partitioned body 120B is also placed over the mount section 111. This makes the surrounding mold 120 cover the yoke fitting part 113. In this condition, as shown in FIGS. 12(a) and 12(b), the second yoke core 72 of the second yoke 70 is fitted in the second ring groove 122 of the surrounding mold 120. Further, the first yoke core 62 of the first yoke 60 is fitted in the first ring groove 121 of the surrounding mold 120. Fitting the first yoke core 62 in the first ring groove 121 moves up the first yoke 60.

(Mold Clamping Step E)

Figure 13A:
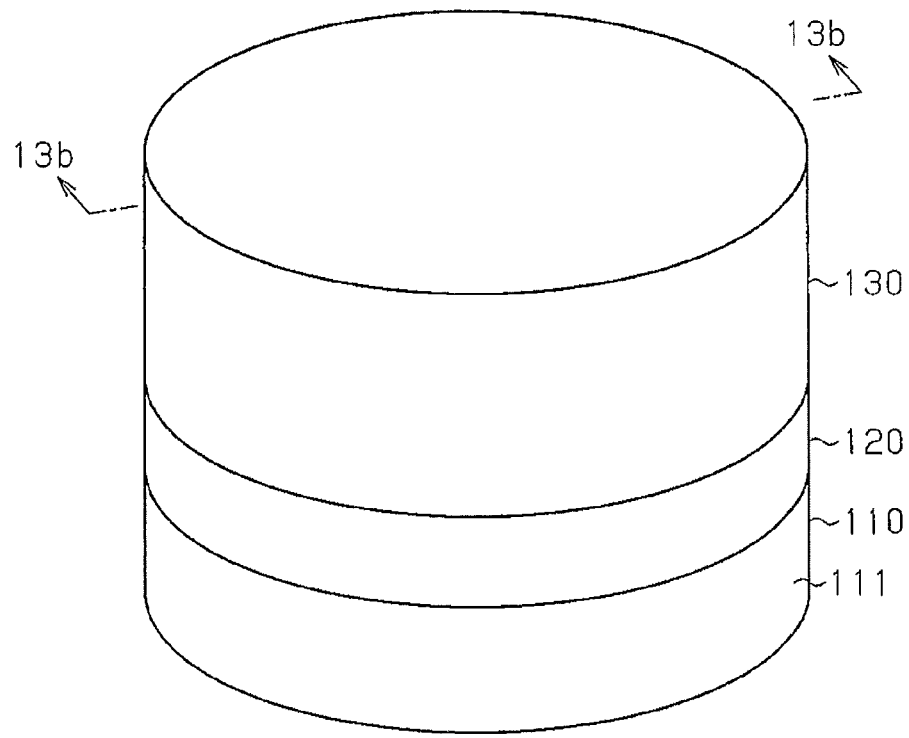
FIG. 13(a) is a perspective view showing a mold clamping step E.

As shown in FIG. 13(a), the upper mold 130 is placed over the surrounding mold 120 and around the collar 51.

(Injecting Step)

Figure 13B:
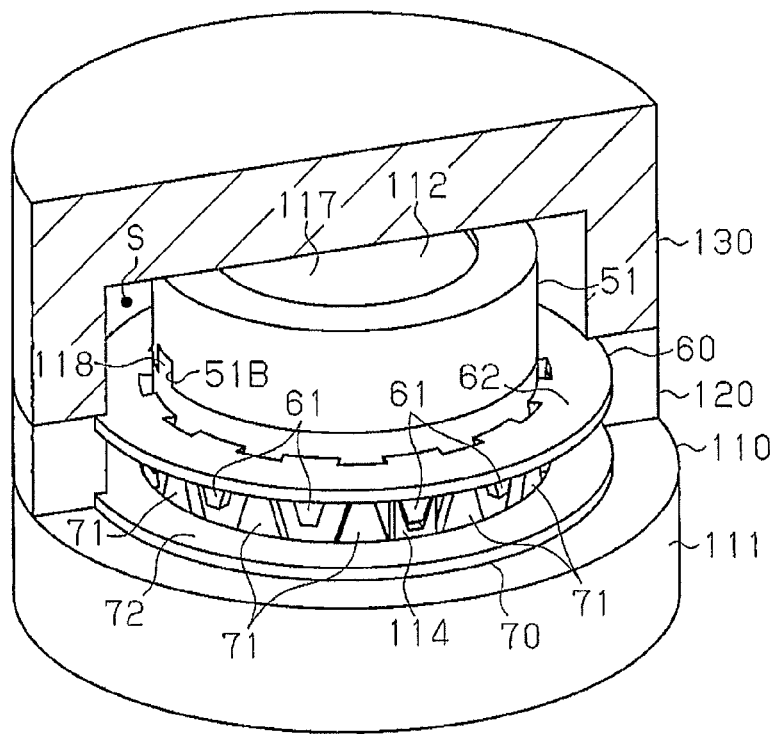
FIG. 13(b) is a sectional view taken along line 13b-13b of FIG. 13(a).

As shown in FIG. 13(b), the filling space S is formed between the inner surface of the upper mold 130 and the lower mold 110, between the inner surface of the surrounding mold 120 and the lower mold 110, and inside the groove part 111A. Resin as a molding material is poured into the filling space S.

(Cooling Step)

Figure 14A:
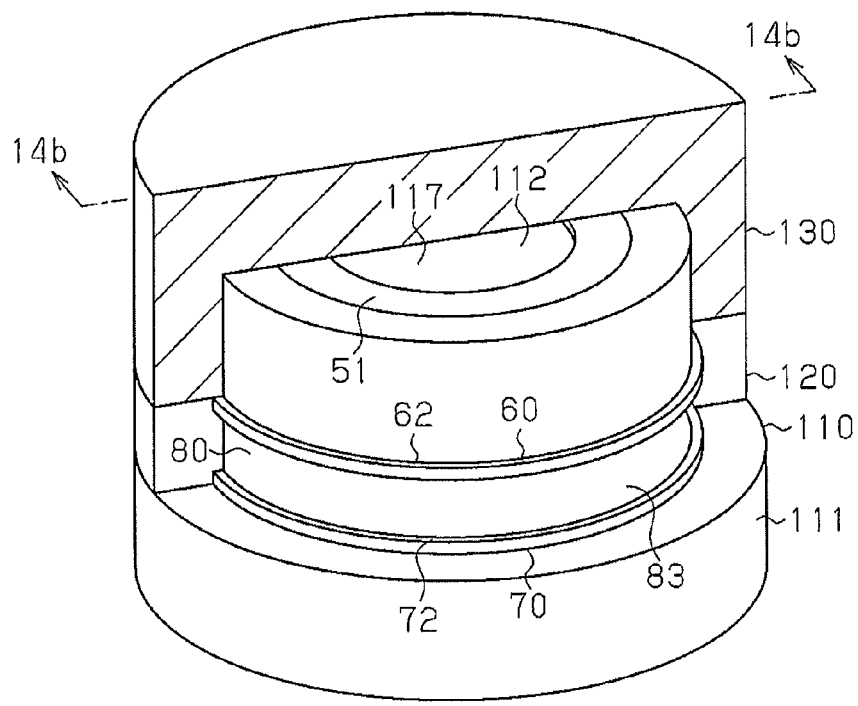
FIG. 14(a) is a perspective view showing a cooling step.
Figure 14B:
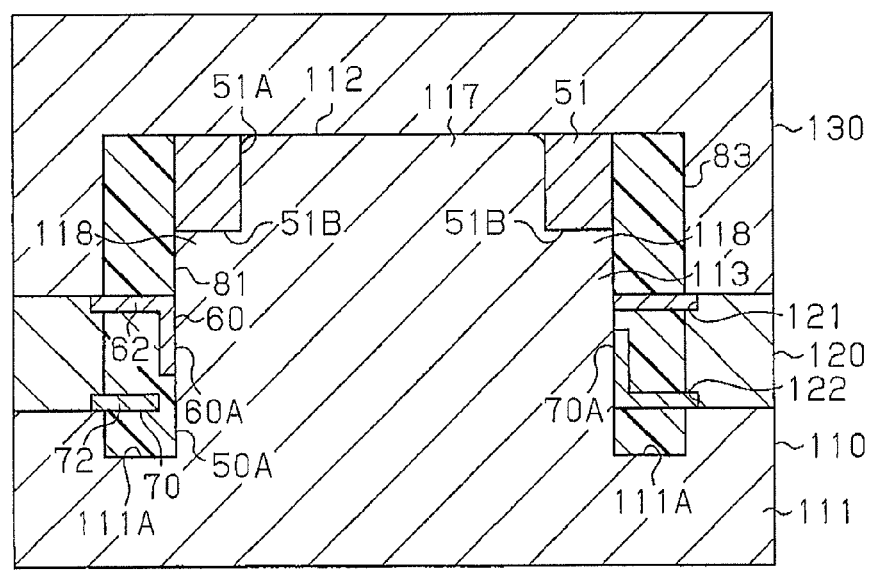
FIG. 14(b) is a sectional view taken along line 14b-14b of FIG. 14(a).

As shown in FIGS. 14(a) and 14(b), the molding material in the filling space S is cooled to shape the resin section 80.

(Mold Opening Step)

The surrounding mold 120 and the upper mold 130 are detached from the lower mold 110.

(Extracting Step)

The yoke unit 50 is moved up to extract the yoke unit 50 from the lower mold 110.

The yoke unit 50 of the first embodiment achieves the following effects.

(1) According to the conventional manufacturing method, through holes are formed in the first and second yoke cores 62 and 72 and a pin is inserted into both of these through holes to determine the respective positions of the first and second yokes 60 and 70. In this method, errors in the positions of the through holes in the first and second yoke cores 62 and 72 might reduce the accuracy in the respective positions of the first and second yokes 60 and 70.

According to the first embodiment, the yoke unit 50 includes the recessed part 82 formed in the inner surface 81 of the resin section 80. The lower mold 110 includes the projecting part 114. Thus, in the mold clamping step B, the position of the first yoke 60 in the circumferential direction relative to the lower mold 110 can be determined by making the first magnetic pole tooth 61 contact the support surface 116 of the projecting part 114. In the mold clamping step A, the position of the second yoke 70 in the circumferential direction relative to the lower mold 110 can be determined by making the second magnetic pole tooth 71 contact the side surface 115 of the projecting part 114. As a result, the respective positions of the first and second yokes 60 and 70 can be determined in the circumferential direction.

Compared to the conventional manufacturing method using a through hole, the aforementioned method can suppress a reduction of accuracy in the respective positions of the first and second yokes 60 and 70. In the conventional manufacturing method using a pin, if the pin becomes worn to be deformed, accuracy in the respective positions of the first and second yokes 60 and 70 might be reduced. In this regard, according to the first embodiment, using the projecting part 114 having higher stiffness than a pin can suppress deformation of the projecting part 114 due to its wear.

The conventional manufacturing method involves formation of through holes in the first and second yokes 60 and 70, increasing the magnetic resistance of the magnetic sensor 43. This might reduce the detection sensitivity of the torque detector 40. In this regard, the first embodiment is intended for the method using the projecting part 114. Thus, unlike the conventional manufacturing method, the method of the first embodiment does not involve formation of through holes in the first and second yokes 60 and 70. This suppresses a reduction of the detection sensitivity of the torque detector 40.

In the yoke unit 50, the volume of the resin section 80 is smaller than a resin section 80 where the recessed part 82 is not formed. This can contribute to weight reduction of the resin section 80. Additionally, a difference between the magnetic resistance of the resin section 80 and the magnetic resistance of air is sufficiently small. This suppresses a reduction of the detection sensitivity of the torque detector 40 to be caused by the presence of the recessed part 82.

(2) The projecting part 114 of the lower mold 110 has the support surface 116 which has a V shape. This structure allows the projecting part 114 to support both the first and second tilted parts 61A and 61B of the first magnetic pole tooth 61 from below. Thus, in the mold clamping step B, the respective positions of the first yoke 60, the lower mold 110, and the second yoke 70 in the circumferential direction are determined with a higher degree of accuracy.

(3) The first recessed portion 82A contacts the base end of the first tilted part 71A. The second recessed portion 82B contacts the base end of the second tilted part 71B. In the injecting step, the resin section 80 is shaped while the side surface 115 of the projecting part 114 and the second magnetic pole tooth 71 contact each other. Thus, the position of the second yoke 70 in the circumferential direction relative to the projecting part 114 is unlikely to be shifted in the injecting step and the cooling step.

(4) The side surface 115 of the projecting part 114 extends along the axis line of the lower mold 110. Thus, in the extracting step, the yoke unit 50 is unlikely to get stuck with the side surface 115 while the yoke unit 50 is moved up.

(Second embodiment)

A second embodiment of this invention is described by referring to FIGS. 15(a) to 17. The second embodiment differs from the first embodiment in that the outer surface 50B of the yoke unit 50 has an uneven shape and the inner surface of the surrounding mold 120 and the outer surface of the groove part 111A each have an uneven shape. Parts of the second embodiment corresponding to those of the first embodiment will not be described in detail.

Figure 15A:
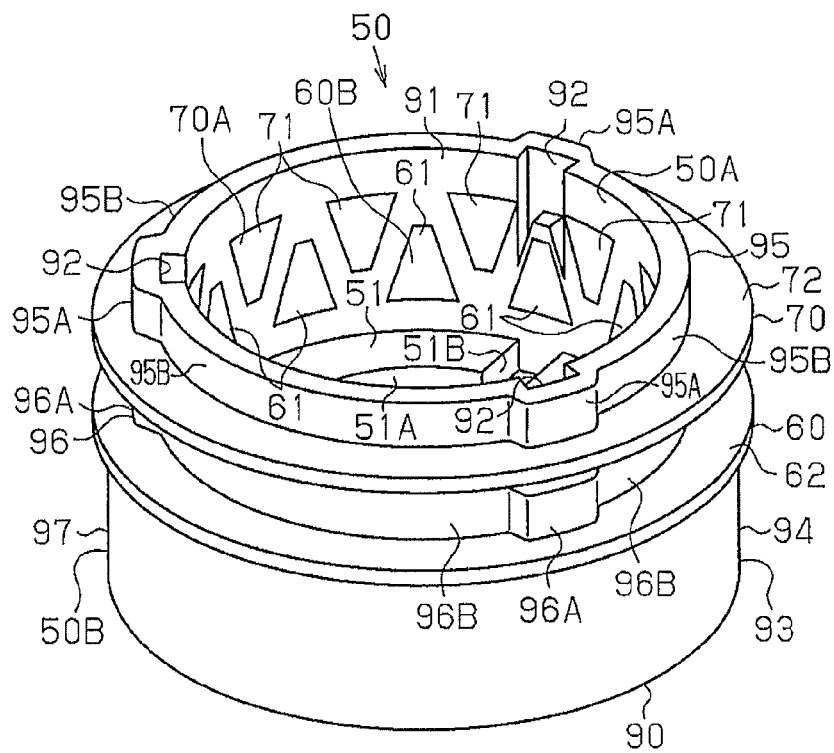
FIG. 15(a) is a perspective view of a yoke unit forming a torque detector according to a second embodiment of this invention.
Figure 15B:
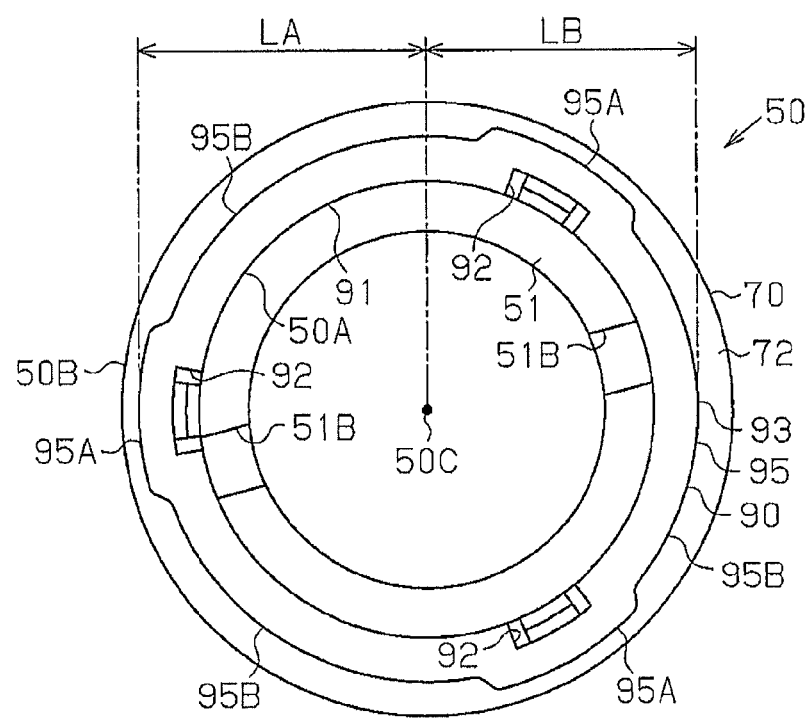
FIG. 15(b) is a plan view of the yoke unit.

As shown in FIGS. 15(a) and 15(b), the yoke unit 50 includes the inner surface 50A, the outer surface 50B, the collar 51, the first and second yokes 60 and 70, and a resin section 90. The resin section 90 includes an inner surface 91, three recessed parts 92, and an outer surface 93. The resin section 90 covers the respective outer circumferences of the first and second magnetic pole teeth 61 and 71. The resin section 90 fills in between the first and second magnetic pole teeth 61 and 71.

The three recessed parts 92 are formed in the inner surface 91 of the resin section 90 while spaced out from each other at intervals of 120 degrees. The three recessed parts 92 are each formed between adjacent second magnetic pole teeth 71. The resin section 90 makes the first and second yokes 60 and 70 and the collar 51 integral with each other. This fixes the respective positions of the first and second yokes 60 and 70 and the collar 51. The first and second yokes 60 and 70 and the collar 51 are fixed while they do not contact each other.

The outer surface 93 includes a first end part 94, a second end part 95, and an intermediate part 96. The first end part 94 corresponds to the collar 51 and has a circular shape. The second end part 95 is on an opposite side of the collar 51. The second end part 95 includes three recessed part facing portions 95A and three recessed part not facing portions 95B. The position of each of the recessed part facing portions 95A is the same as the position of the recessed part 92 in the circumferential direction of the yoke unit 50. Each of the recessed part not facing portions 95B is formed between adjacent recessed part facing portions 95A. The intermediate part 96 is defined between the first and second yoke cores 62 and 72. The intermediate part 96 includes three recessed part facing portions 96A and three recessed part not facing portions 96B. The position of each of the recessed part facing portions 96A is the same as the position of the recessed part 92 in the circumferential direction of the yoke unit 50. Each of the recessed part not facing portions 96B is formed between adjacent recessed part facing portions 96A.

The outer surface 50B of the yoke unit 50 is formed of the outer surface 93 of the resin section 90, and the respective outer surfaces of the first and second yoke cores 62 and 72. The inner surface 50A of the yoke unit 50 is formed of the inner surface 60A of the first yoke 60 as the inner surface of the first magnetic pole tooth 61, the inner surface 70A of the second yoke 70 as the inner surface of the second magnetic pole tooth 71, the inner surface 91 of the resin section 90, and the inner surface 51A of the collar 51.

As shown in FIG. 15(b), a section of the yoke unit 50 formed of the resin section 90 has an outer diameter that differs between places of the circumferential direction. A distance LB between the center 50C of the yoke unit 50 and the recessed part not facing portion 95B is smaller than a distance LA between the center 50C and the recessed part facing portion 95A. Specifically, in the resin section 90, the distance LB between the outer surface 93 in an area where the recessed part 92 is not formed and the center 50C is smaller than the distance LA between the outer surface 93 in an area where the recessed part 92 is formed and the center 50C. A distance between the center 50C and the first end part 94 is the same as the distance LB.

Figure 16:
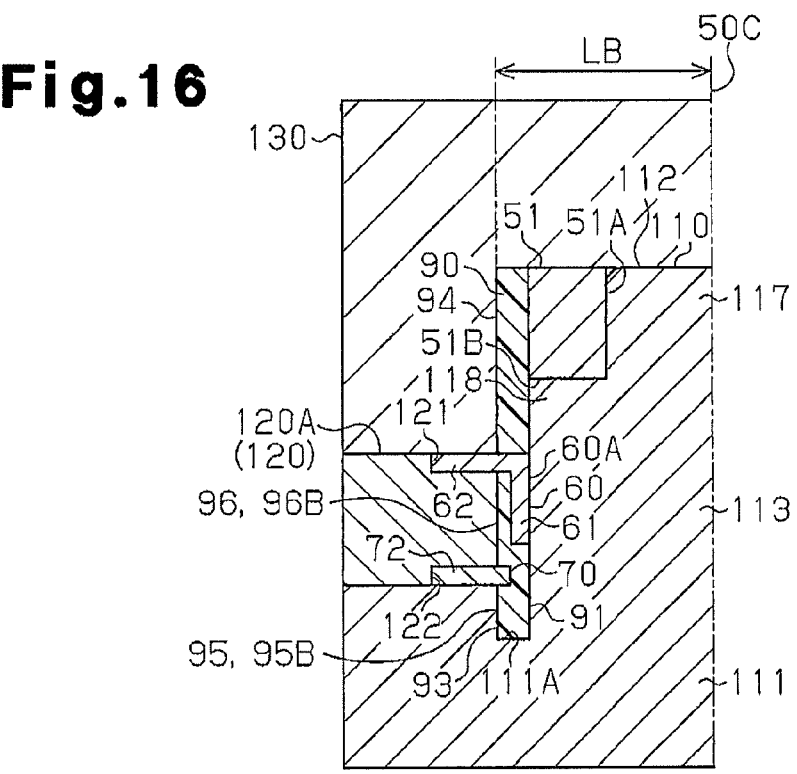
FIG. 16 is a partial sectional view of the yoke unit including the center of the yoke unit and an area of the yoke unit where a recessed part is not formed.
Figure 17:
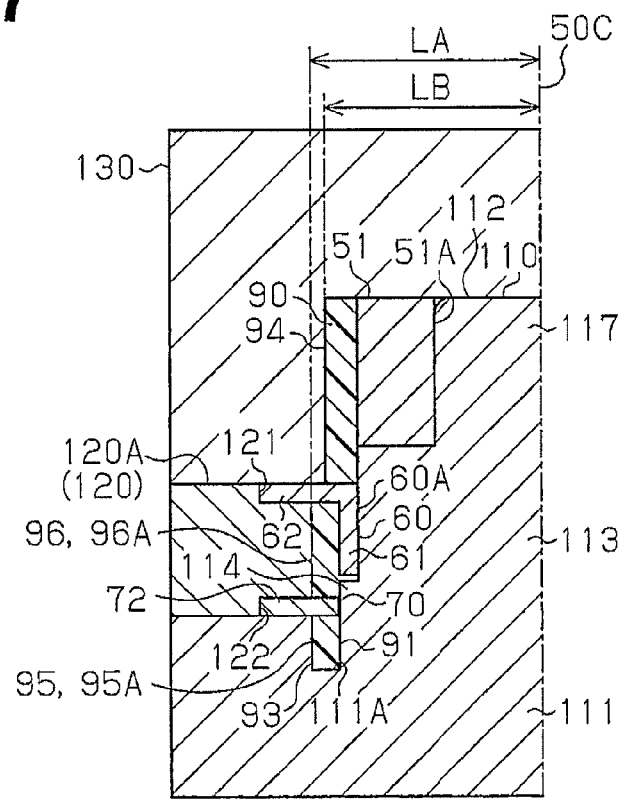
FIG. 17 is a partial sectional view of the yoke unit including the center of the yoke unit and an area of the yoke unit where the recessed part is formed.

A method of manufacturing the yoke unit 50 is described by referring to FIGS. 16 and 17.

The first end part 94 is formed of the inner surface of the upper mold 130. The second end part 95 is formed of the outer surface of the groove 111A. The intermediate part 96 is formed of the inner surface of the surrounding mold 120.

A distance between the center 50C and the inner surface of the surrounding mold 120 in an area where the recessed part 92 is not formed is the same as the distance LB. A distance between the center 50C and the inner surface of the surrounding mold 120 in an area where the recessed part 92 is formed is the same as the distance LA. A distance between the center 50C and the outer surface of the groove 111A in an area where the recessed part 92 is not formed is the same as the distance LB. A distance between the center 50C and the outer surface of the groove 111A in an area where the recessed part 92 is formed is the same as the distance LA. A distance between the center 50C and the inner surface of the upper mold 130 in an area where the recessed part 92 is not formed is the same as the distance LB. A distance between the center 50C and the inner surface of the upper mold 130 in an area where the recessed part 92 is formed is also the same as the distance LB.

The yoke unit 50 of the second embodiment achieves the following effects in addition to the effects (1) to (4) of the first embodiment.

(5) The yoke unit 50 is thinned in an area where the recessed part 92 is not formed. This can reduce the weight of the yoke unit 50, compared to the yoke unit of the first embodiment not subjected to thinning. This further reduces the volume of the resin section 90, so that the amount of resin as a molding material can be reduced.

(6) If the yoke unit 50 is to be manufactured by the method using a pin, reducing the inner diameter of the surrounding mold 120 makes the inner surface of the surrounding mold 120 and the pin contact each other. Hence, only a limited amount can be thinned in an area where the pin is to be inserted. In this regard, in the second embodiment, the respective positions of the first and second yokes 60 and 70 can be determined using the shape of the inner surface 50A of the yoke unit 50. Thus, the outer diameter of the resin section 90 can be smaller than that of a yoke unit manufactured by the conventional manufacturing method.

The first and second embodiments can be changed as follows.

In each of the aforementioned embodiments, the first and second magnetic pole teeth 61 and 71 may be formed into a U shape.

In each of the aforementioned embodiments, the number of the projecting parts 114 may be one, two, or four or more. Where two or more projecting parts 114 are provided, all the projecting parts 114 are arranged at regular intervals or irregular intervals on the circumferential surface of the yoke fitting part 113.

Figure 18A:
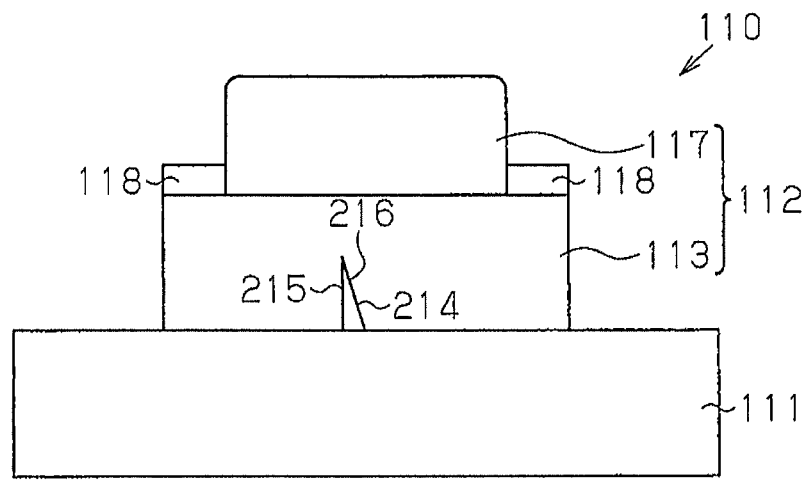
FIG. 18(a) is a plan view showing a lower mold according to a different example.
Figure 18B:
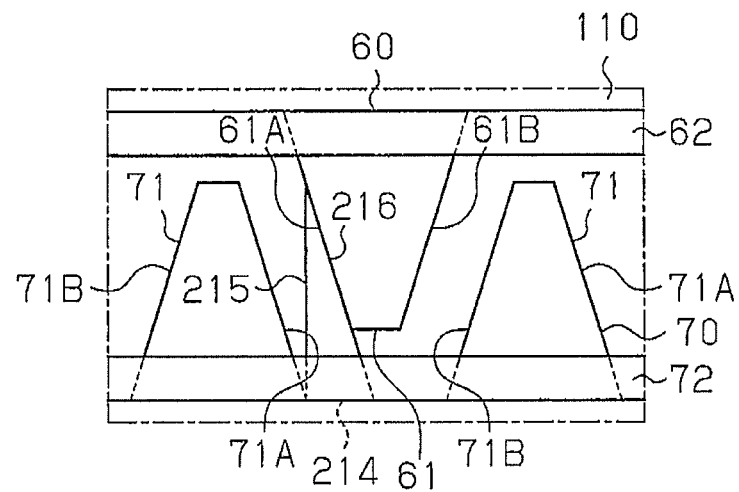
FIG. 18(b) is a partial front view showing a projecting part and its vicinity of the lower mold in an enlarged manner according to the different example.
Figure 19:
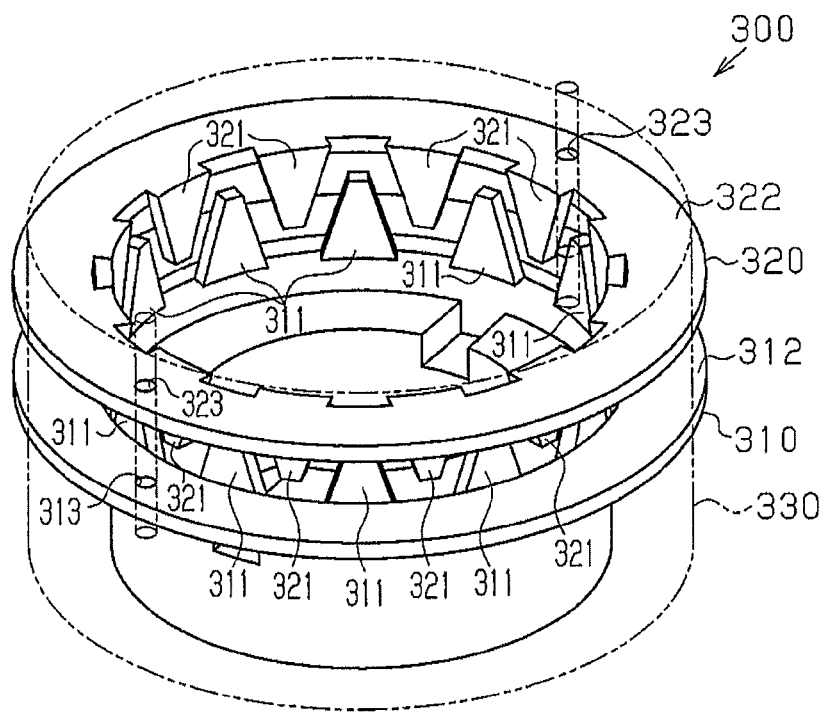
FIG. 19 is a perspective view showing the inside of a conventional yoke unit.
Figure 20:
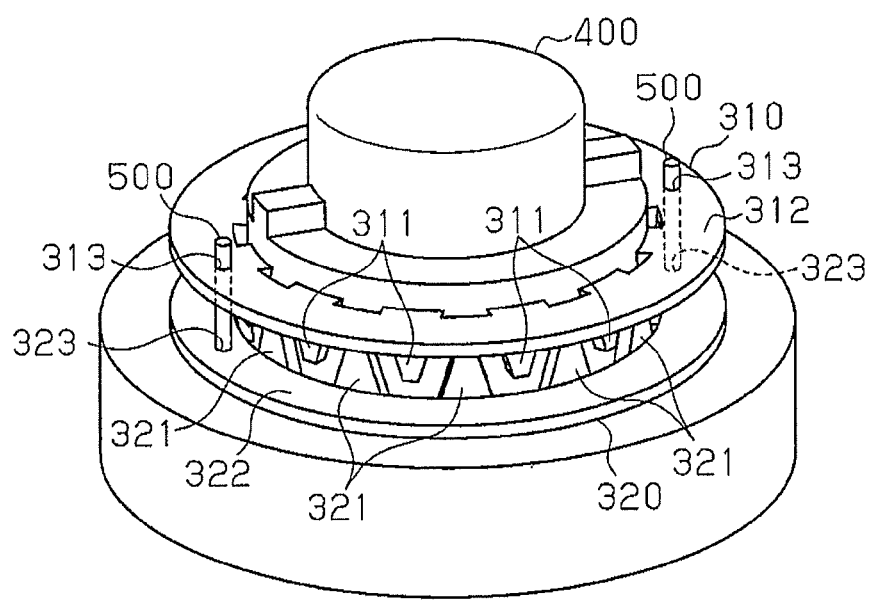
FIG. 20 is a perspective view showing a step of manufacturing the conventional yoke unit.

In each of the aforementioned embodiments, the projecting part 114 can be replaced by a projecting part 214 shown in FIG. 18. Each projecting part 214 has a shape not including a part of the projecting part 114 corresponding to an area between the second tilted part 61B and the second tilted part 71B. In this case, a side surface 215 contacts the first tilted part 71A of the second magnetic pole tooth 71 in the mold clamping step A, and a support surface 216 contacts the first tilted part 61A of the first magnetic pole tooth 61 in the mold clamping step B. This allows the lower mold 110 to determine the respective positions of the first and second yokes 60 and 70 accurately in the circumferential direction.

In each of the aforementioned embodiments, each of the projecting parts 114 has a shape corresponding to the V shape of the first magnetic pole tooth 61. Meanwhile, the projecting part 114 may also have a shape corresponding to the V shape of the second magnetic pole tooth 71.

In each of the aforementioned embodiments, each of the three projecting parts 114 is made to contact the first magnetic pole tooth 61 in the mold clamping step B. Meanwhile, one or two of the three projecting parts 114 may not be required to contact the first magnetic pole tooth 61.

In each of the aforementioned embodiments, each of the three projecting parts 114 is made to contact the second magnetic pole tooth 71 in the mold clamping step A. Meanwhile, one or two of the three projecting parts 114 may not be required to contact the second magnetic pole tooth 71.

In each of the aforementioned embodiments, the cooling step proceeds while a gap is maintained between each of the projecting parts 114 and the first magnetic pole tooth 61. Meanwhile, the cooling step may proceed while each of the projecting parts 114 contacts the first magnetic pole tooth 61. In this case, upward movement of the first yoke 60 is omitted in the mold clamping step D. In the yoke unit 50 manufactured by this method, the recessed part 82 contacts the first magnetic pole tooth 61.

In each of the aforementioned embodiments, the cooling step proceeds while each of the projecting parts 114 contacts the second magnetic pole tooth 71. Meanwhile, the cooling step may proceed while a gap is maintained between each of the projecting parts 114 and the second magnetic pole tooth 71. In this case, after the mold clamping step B, in order to avoid change of the position of the second yoke 70 in the circumferential direction relative to the first yoke 60, the second yoke 70 is moved up or down relative to the lower mold 110. In the yoke unit 50 manufactured by this method, the recessed part 82 does not contact the second magnetic pole tooth 71.

According to the method of manufacturing the yoke unit 50 of each of the aforementioned embodiments, the second yoke 70 is fitted to a position below the first yoke 60. Meanwhile, the first yoke 60 may be fitted to a position below the second yoke 70.

The torque detector 40 including the yoke unit 50 of this invention can be applied to a device except the electrically-driven power steering device 1. The yoke unit 50 of this invention can be applied to a device except the torque detector 40. In summary, this invention can be applied to any device as long as the device includes a yoke unit including a first yoke with multiple first magnetic pole teeth, a second yoke with multiple second magnetic pole teeth, and a resin section that makes the first and second yokes integral with each other.

The invention claimed is:

1. A yoke unit comprising:
   a first yoke with multiple first magnetic pole teeth;
   a second yoke with multiple second magnetic pole teeth, each of the second magnetic pole teeth being arranged between two adjacent ones of the first magnetic pole teeth, the second yoke being coaxial with the first yoke; and
   a resin section that makes the first and second yokes integral with each other, the resin section including a recessed part formed in an inner surface of the resin section, the recessed part being arranged between the first magnetic pole tooth and the second magnetic pole tooth, wherein a distance between an outer surface of the resin section in an area where the recessed part is not formed and the center of the yoke unit is smaller than a distance between the outer surface of the resin section in an area where the recessed part is formed and the center of the yoke unit.

2. The yoke unit according to claim 1, wherein
   the first magnetic pole tooth has a V shape in a front view of the first magnetic pole tooth, and
   the recessed part has a shape corresponding to the V shape.

3. The yoke unit according to claim 1, wherein the recessed part contacts the second magnetic pole tooth.

4. A torque detector comprising the yoke unit as recited in claim 1.

5. An electrically-driven power steering device comprising the torque detector as recited in claim 4.

6. A method of manufacturing a yoke unit, the yoke unit comprising a first yoke with multiple first magnetic pole teeth, a second yoke with multiple second magnetic pole teeth, and a resin section that makes the first and second yokes integral with each other, the first and second yokes being coaxial with each other, each of the second magnetic pole teeth being arranged between the two adjacent ones of the first magnetic pole teeth, the method comprising:
   a first step of fitting the first yoke to a lower mold to support the first and second yokes from respective inner surfaces of the first and second yokes;
   a second step of fitting the second yoke to the lower mold; and
   a third step of shaping the resin section, wherein
   in the first step, the position of the first yoke in the circumferential direction relative to the lower mold is determined by making the first magnetic pole tooth contact a projecting part formed in the lower mold, and
   in the second step, the position of the second yoke in the circumferential direction relative to the lower mold is determined by making the second magnetic pole tooth contact the projecting part.

7. A torque detector comprising the yoke unit manufactured by the method as recited in claim 6.

8. An electrically-driven power steering device comprising the torque detector as recited in claim 7.

* * * * *